United States Patent
Ang et al.

(10) Patent No.: US 6,209,933 B1
(45) Date of Patent: Apr. 3, 2001

(54) TRUNK RELEASE HANDLE

(75) Inventors: Leoncio C. Ang, Bloomfield Hills; Robert F. Bennett, Clarkston; James F. Clisham, Farmington Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/295,114

(22) Filed: Apr. 19, 1999

(51) Int. Cl.$^7$ .................................................... E05C 19/18
(52) U.S. Cl. .............. 292/336.3; 292/347; 292/DIG. 43; 292/DIG. 65; 296/76
(58) Field of Search ................................ 292/336.3, 347, 292/DIG. 38, DIG. 43, DIG. 63, DIG. 65, DIG. 71; 362/84, 496, 501, 100; 40/452, 616; 296/76

(56) References Cited

U.S. PATENT DOCUMENTS

| | | | |
|---|---|---|---|
| 2,996,327 | * 8/1961 | France | 292/DIG. 43 |
| 3,543,329 | * 12/1970 | Gulette | 292/347 |
| 3,992,909 | * 11/1976 | Mcghee | 70/379 |
| 4,016,450 | * 4/1977 | Balekjian | 315/149 |
| 4,080,812 | * 3/1978 | Knott | 70/256 |
| 4,155,233 | * 5/1979 | Lira | 70/92 |
| 4,401,050 | * 8/1983 | Britt | 116/205 |
| 4,664,437 | * 5/1987 | Queveau | 296/146 |
| 4,835,890 | * 6/1989 | Nelson | 40/616 |
| 4,981,314 | * 1/1991 | Carr | 292/347 |
| 5,008,551 | * 4/1991 | Randolph | 250/462.1 |
| 5,053,930 | * 10/1991 | Benavides | 362/80 |
| 5,129,694 | * 7/1992 | Tanimoto | 292/347 |
| 5,445,326 | * 8/1995 | Ferro | 292/336 |
| 5,522,243 | * 6/1996 | Kusmiss | 70/330 |
| 5,580,153 | * 12/1996 | Motz | 362/80 |
| 5,607,222 | * 3/1997 | Woog | 362/84 |
| 5,655,826 | * 8/1997 | Kuono | 362/24 |
| 5,757,111 | * 5/1998 | Sato | 313/111 |
| 5,793,358 | * 8/1998 | Petkovic | 345/168 |
| 5,815,228 | * 9/1998 | Flynn | 349/71 |
| 5,859,479 | * 1/1999 | David | 307/10.8 |
| 5,861,618 | 1/1999 | Berson . | |
| 6,086,131 | * 7/2000 | Bingle et al. | 296/76 |

OTHER PUBLICATIONS

DaimlerChrysler Employee News Daily; Mar. 30, 1999; p. 2, third paragraph—An emergency trunk release . . .
DaimlerChrysler Employee News Daily; Dec. 16, 1998.
DaimlerChrysler Employee News Daily; Jun. 8, 1999.

* cited by examiner

*Primary Examiner*—Gary W. Estremsky
(74) *Attorney, Agent, or Firm*—Marc Lorelli

(57) ABSTRACT

An release handle mechanism for a motor vehicle trunk lid is provided. The release handle mechanism includes a handle, that when activated can release the latch that couples the trunk lid to the vehicle body. The mechanism includes a housing having a plurality of sides. One side includes an inclined surface onto which the handle is pivotally connected such that the pivoting of the handle causes the handle to move outward and downward. The mechanism also includes a light source disposed within one side of the housing. The light source is disposed less than 4 inches away from the handle and is capable of directing light towards said handle as well as the trunk. The handle itself is comprised of a generally cylindrical horizontal portion and a pivot portion that is connected to the inclined surface. In the first embodiment the handle is comprised of a thermoplastic polymer resin, containing a phosphorescent, while in the second embodiment, the housing is made of material with the phosphorescent additive. A method for providing an illuminated handle in a vehicle trunk is also provided in the present invention.

15 Claims, 2 Drawing Sheets

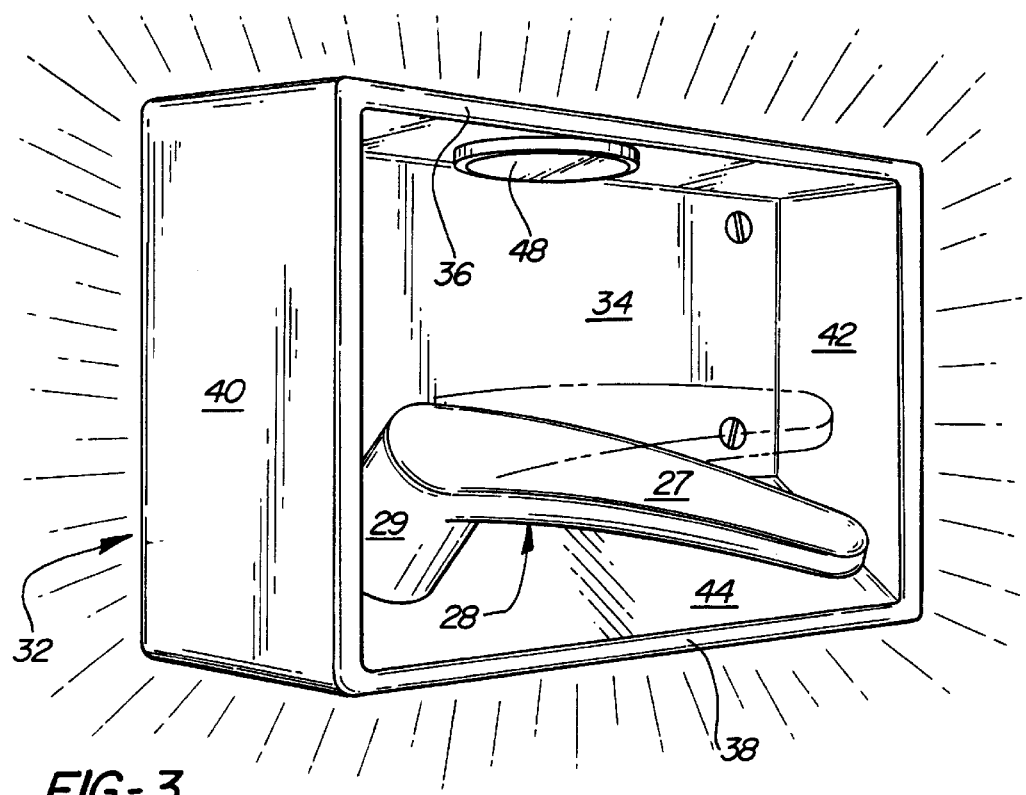
FIG-3
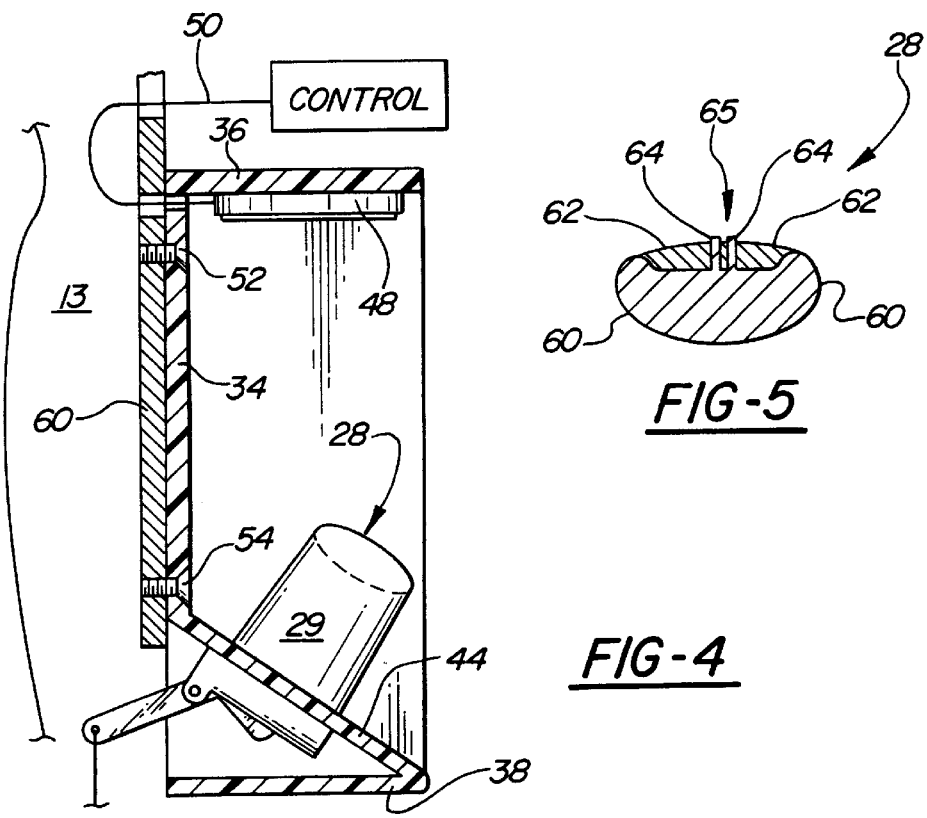
FIG-4
FIG-5

TRUNK RELEASE HANDLE

BACKGROUND OF THE INVENTION

1. Technical Field

The present invention relates in general to release handles for motor vehicle trunks. More particularly, but without restriction to the particular embodiment and/or use which is shown and described for purposes of illustration, the present invention relates to handles for releasing vehicle trunk lids that can be illuminated in the dark.

2. Discussion

In a conventional automobile, there is a passenger compartment and a cargo compartment. The passenger compartment typically consists of two rows of seats to accommodate a driver as well as a number of passengers. The cargo compartment, typically called a trunk, is separated from the passenger compartment by the rear row of seats. The trunk is bounded by the trunk lid, which acts to contain cargo within the trunk. Typically, the trunk lid is capable of being latched to the vehicle body to create such a bounded cargo compartment or trunk. When the latch is released, the trunk lid can pivot about a hinge to allow access to the trunk in order to add or remove cargo. Because of the trunk lid acting to secure and conceal cargo in the trunk while in the closed position, light is generally precluded from entering the trunk.

The use of latches on trunk lids to secure the lid in a closed position is well known in the art. U.S. Pat. Nos. 3,961,504; 4,974,885; and 4,979,384 detail a representative sample of the state of the art of trunk latches and are herein incorporated by reference. While all of the devices described in these patents perform satisfactorily, sometimes there may be a desire to open the trunk latch from the inside of the trunk, which may be lacking visible light.

General Motors will soon employ a handle mechanism in the trunk of their motor vehicles that are capable of releasing the trunk latch. The General Motors handle is illuminated by a light source that shines directly upon the handle for up to 1 hour after the trunk is closed. This handle works satisfactorily, but it creates a drain on the vehicle battery for 1 hour every time the trunk is open that may be detrimental to vehicles in certain situations. There is, therefore, a desire to provide a handle that may be visible in the trunk while limiting the drain on the vehicle battery.

SUMMARY OF THE INVENTION

Accordingly, it is a principal objective of the present invention to provide a handle accessible from the inside of the trunk adapted to release the trunk lid latch.

It is another objective of the present invention to provide a handle constructed of phosphorescent material enabling it to glow in the dark for hours after brief exposure to light.

It is still another objective of the present invention to provide a method for enabling a phosphorescent material disposed in the trunk of a vehicle to glow in the dark for an extended period of time.

It is still a further objective of the present invention to provide a handle disposed in a housing construction of phosphorescent material enabling the housing to glow in the dark for hours after brief exposure to light.

In one form, the present invention provides a release handle mechanism disposed on the interior surface of a trunk lid of a motor vehicle. The release handle mechanism includes a handle, that when activated can release the latch that couples the trunk lid to the vehicle body. The mechanism includes a housing having a plurality of sides. One side includes an inclined surface onto which the handle is pivotally connected such that the pivoting of the handle causes the handle to move outward and downward. The mechanism also includes a light source disposed within one side of the housing. The light source is disposed less than 4 inches away from the handle and is capable of directing light towards said handle as well as the trunk. The handle itself is comprised of a generally cylindrical horizontal portion and a pivot portion that is connected to the inclined surface. In the first embodiment the handle is comprised of a translucent thermoplastic resin, blend, or alloy, such as: (1) polycarbonate/polybutylene terephthalate alloy (PC/PBT), one such material is manufactured for commercial sale under the GE Plastics Zenoy family; (2) polycarbonate/ABS alloy/blend (PC/ABS), one such material is manufactured for commercial sale under the Dow Chemical's Pulse family resins; (3) acrylontrile/butadiene/styrene terpolymers, one such material is manufactured for commercial sale under the Dow Chemical's Magnum family of resins; (4) polypropylene/acrylic alloy, one such material is manufactured for commercial sale under the Montell Polymers' family of resins; (5) Polycarbonate; (6) acrylic polymers; or (7) long glass fiber reinforced polypropylene resins. The thermoplastic resin of the handle contains a phosphorescent additive, such as those phosphorescent color concentrates commercially available from Uniform Color Company or M. A. Hanna Color. In the second embodiment, the handle is made of a conventional plastic material such as polypropylene while the housing is constructed of a thermoplastic polymer resin, containing a phosphorescent additive.

In another form, the invention provides a method of illuminating an apparatus in a vehicle trunk. The method begins with the opening of the vehicle trunk lid. Then the light source, as previously described, is activated. The trunk can then be closed by the latching of the trunk lid to the vehicle. After the closing of the trunk lid, the light source remains activated for a pre-determined period of time, which is sufficient to provide a phosphorescent material to illuminate for a period of time. Also while the engine is running the light source may be activated periodically to provide additional staying power for the illumination of the phosphorescent material.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be read in conjunction therewith, and like reference numerals are employed to designate identical components in various views:

FIG. 3 is a front perspective view of a second embodiment of the release handle assembly;

FIG. 4 is a cross sectional view along the line 4—4 of FIG. 2; and

FIG. 5 is a cross sectional view through the handle of the release handle assembly that is produced by a two-shot injection process.

DETAILED DESCRIPTION OF THE PREFERRED EMBODIMENT

Figure 1:
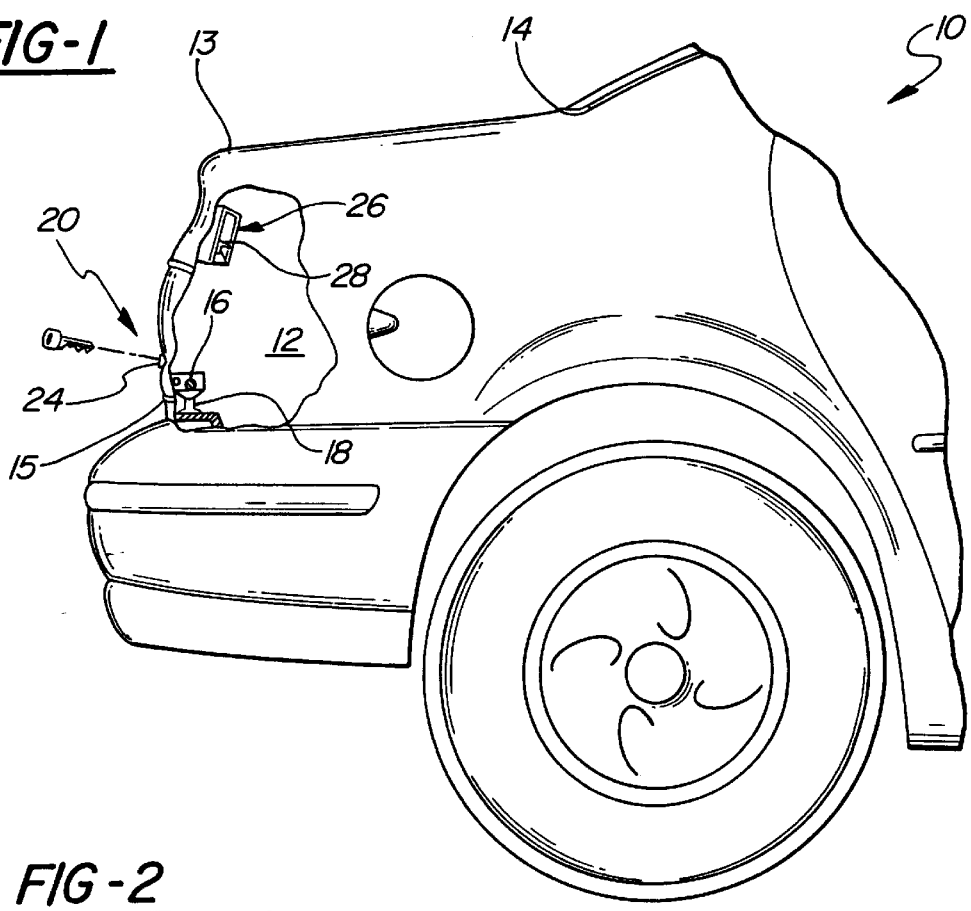
FIG. 1 is a perspective view of the trunk of a motor vehicle with a portion cut-away to illustrate the release handle assembly.

Referring now to the drawings, there is depicted a release handle apparatus illustrating the preferred embodiment of the present invention. With reference to FIG. 1, a vehicle 10 with a trunk 12 is provided. Although the present invention is described in reference to trunk 12, it should be appreciated that any cargo or storage compartment would be equivalent. Preferably, trunk 12 includes a trunk lid 13 that is hingedly attached to vehicle 10 on its rear edge 14. The front edge 15 of trunk lid 13 preferably includes a latch 16 for engaging a striker 18 disposed on vehicle 10 for maintaining the trunk lid 13 in the closed position, as illustrated in FIG. 1. Latch 16 can be disengaged from striker 18 either by a key and lock cylinder arrangement 20 or electronically. The preferred embodiment includes spring means (not shown) to assure latch 16 is engaged to striker 18. Key and lock cylinder arrangement 20 is connected to the spring means by a cable or some other connecting structure. Rotation of the lock cylinder 24 will apply tension to the connecting structure and force the spring means to pivot latch 16 so that it will become disengaged from striker 18. It should be appreciated that any other method or apparatus used to disengage latch 16 from striker 18 known in the art would not deviate from the scope of the present invention. When latch 16 is disengaged from striker 18, trunk lid 13 can be pivoted about its rear edge 14 in order to allow access to the trunk 12.

FIG. 1 illustrates a cut away view of the rear end of vehicle 10 with a portion of the trunk lid 13 cut away to illustrate the release handle mechanism 26. Release handle mechanism 26 includes a handle 28 that is connected to a cable 30, shown in FIG. 4. Handle 30 can be pivoted such that cable 30 is placed in tension and forces latch 16 to become disengaged from striker 18 in a manner similar to that described with respect to the lock cylinder 24. Therefore, pivoting handle 28 will open the latch 16 and allow trunk lid 13 to be pivoted about rear edge 14.

Figure 2:
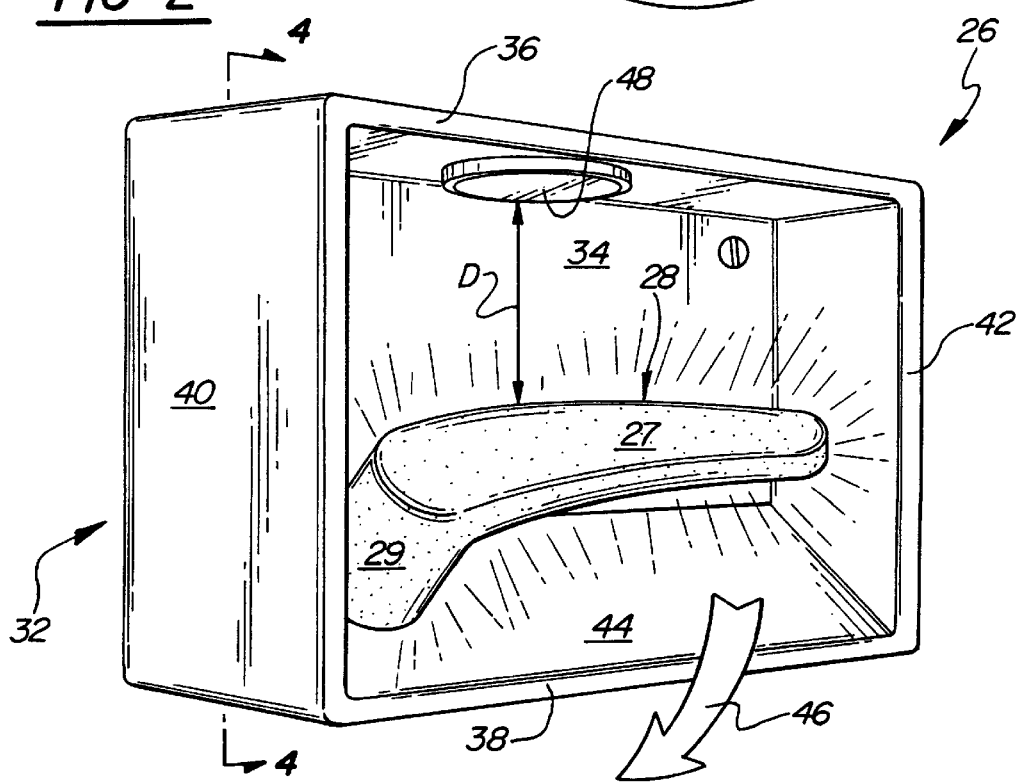
FIG. 2 is a front perspective view of a first embodiment of the release handle assembly.

FIG. 2 illustrates a first embodiment of the release handle mechanism 26 from a frontal prospective. Mechanism 26 is attached to the inner surface 60, see FIG. 4, of the trunk lid 13 and includes a housing 32. Housing 32 includes a back wall 34, a top wall 36, a bottom wall 38, and two opposing side walls 40 and 42. Extending from bottom wall 38 to back wall 34 is an inclined surface 44. Handle 28 includes a generally cylindrical portion 27 that extends horizontally and a short pivot portion 29 that extends vertically and contacts inclined surface 44. Handle 28 is pivotally mounted to inclined surface 44 at pivot portion 29 such that the handle 28 will move downward and outward in the direction indicated by arrow 46 when hand pressure is applied. The top wall 36 includes a light source 48 that is connected to the electrical system of the vehicle 10 via wire 50 for control, see FIG. 4. Light source 48 is disposed in close proximity to handle 28, in the preferred embodiment the distance D is less than 4 inches. Light source 48 can be a Light emitting diode (LED) or an ultraviolet light. Light source 48 shines directly on handle 28 and housing 32 while also providing light to the inside of the trunk 12. In the embodiment illustrated in FIG. 2, handle 28 is comprised of a thermoplastic polymer resin with a phosphorescent additive, such as the additive sold commercially by M.A. Hanna Color under the brand name Hanna FX NiteBrite. The phosphorescent additive exhibits, as its name implies, luminescence that is caused by the absorption of radiation at one wavelength followed by delayed reradiation at different wavelengths that continues for a noticeable time after the incident radiation stops. The handle 28 can be produced through an injection molding process or a blow molding process. The amount of phosphorescent additive can be varied from 3%–10% by weight in the preferred embodiment. A two-shot sequential injection molding process can also be used to include a message or logo into the handle. The two shot-injection molding process includes molding an insert, comprised a standard plastic material, and then injection molding the material with the phosphorescent additive onto the insert component. This reduces the amount of additive that is needed to perform the desired task, it also aids in the construction of a logo. FIG. 5 illustrates a cross sectional view of a two-shot handle 28 through the generally cylindrical portion 27 thereof. The handle 28 includes an insert 60 that is comprised of typical plastic material. Once the insert 60 is formed, a thermoplastic polymer resin with a phosphorescent additive 62 is injected into a mold that includes the insert 60. The thermoplastic polymer resin with a phosphorescent additive 62 is formed into the desired space and forms over the majority of the surface which phosphorescence is desired. Insert 60 can include projections 64 from the base surface 66 in order to create logos or messages 65. The logos or messages 65 created by the projections 64 do not exhibit phosphorescence whereas the thermoplastic polymer resin with a phosphorescent additive 62 does. This creates a contrast, whereby the message or logo 65 created by the projections 64, such as 'open', can be clearly seen. Handle 28, after exposed light source 48 will exhibit phosphorescence for a period of time to provide the would be operator not only a means for opening the trunk lid 13 from inside the trunk 12, but also means to locate the mechanism 26 without any appreciable light in the trunk 12. In the preferred embodiment, an ultraviolet light is used because the expose time needed to illuminate the phosphorescent material for a defined period of time is drastically reduced compared to other types of lights.

FIG. 3 illustrates a second embodiment of the release handle mechanism 26 from a frontal prospective. The only appreciable difference between the first embodiment and the second embodiment is that the second embodiment includes housing 32 is capable of phosphorescence. Handle 28 is not comprised of phosphorescent material in the second embodiment while housing 32 is comprised of such material. It should be realized that the housing 32 with phosphorescent additive covers an area behind handle 28 that is larger than the area covered by the handle to provide an appealing visual impression in which a silhouette of the handle is created by the phosphorescence of the housing 32. It should be appreciated that both embodiments perform the same function, however the second embodiment provides a more attractive and appealing phosphorescent glow to encourage one to use the release handle mechanism 26 when necessary.

FIG. 4 illustrates the first embodiment in a cross sectional view. This view best illustrates the attachment of the mechanism 26 to the inner surface 60 of the trunk lid 13 by bolts 52 and 54.

The light source 48 is controlled in a unique fashion in the present invention, a typical light source in a trunk 12 will be activated when the trunk is open and deactivate when the trunk is closed. In the present invention, light source 48 will activate when the trunk is open and remain activated for a first predetermined period of time after the trunk is closed. This first predetermined period of time in the preferred embodiment is 15 minutes. This is to ensure that the phosphorescent material has been fully exposed to sufficient light so that the part, either handle 28 or housing 32, may exhibit phosphorescence for a second period of time, preferably several hours. The placement of the light source 48 is ever so critical, especially when the trunk lid 13 is opened at night when no appreciable natural light is available to charge the phosphorescent material. The placement of the light source 48 in the same mechanism as the release handle may be critically important if this mechanism is offered as an additional option for vehicles by the manufacturers. Only one unit needs to be applied to the trunk and ensures it will function properly irrespective of the time of day or even placement of the conventional light source for the trunk. Other methods for exposing phosphorescent materials to light in order to ensure proper phosphorescence may also be included. The light source 48 runs off electrical power from the vehicle battery, which is also needed for start-up or cranking of the engine. It should be appreciated that light source 48 can not be activated periodically to ensure illumination and phosphorescence due to possible drain on the vehicle battery, this could compromise vehicle start-up performance. An additional feature of the method could be to allow periodic activation of the light source 48, for a third predetermined period of time, preferably 2 minutes, only while the engine is running and thereby charging the battery.

While the above description constitutes the preferred embodiment of the invention, it will be appreciated that the invention is susceptible to modification, variation, and change without departing from the proper scope or fair meaning of the accompanying claims.

What is claimed is:

1. In a motor vehicle having a trunk and a trunk lid, said trunk lid being hingedly attached to said motor vehicle, said trunk lid capable of being latched to said vehicle to create a closed position of said trunk lid by means of a latch, said latch capable of being released to create an open position of the trunk lid, a release handle mechanism for said trunk lid comprising:

a housing;

a handle disposed within said housing capable of releasing the latch, said handle comprised of phosphorescent material; and a light source connected to said housing and disposed within the trunk, said light source capable of being selectively activated when the trunk lid is open and capable of directing light towards said handle and said trunk while activated, said light source selectively illuminates said phosphorescent material of said handle such that said phosphorescent material will exhibit phosphorescence after the light source is de-activated;

wherein said housing includes a back wall and an inclined surface extending therefrom upon which said handle is pivotally mounted.

2. The release handle mechanism as set forth in claim 1, further comprising said light source disposed within 16 inches of said handle.

3. The release handle mechanism as set forth in claim 1, further comprising said light source disposed within 4 inches of said handle.

4. The release handle mechanism as set forth in claim 2 or 3, wherein said light source is comprised of an ultraviolet light.

5. The release handle mechanism as set forth in claim 1, wherein said handle is comprised of a material selected from the group of polycarbonate/polybutylene terephthalate, polycarbonate/ABS alloys/blends, acrylonitrile/butadiene/styrene terpolymers, polypropylene/acrylic alloy, polycarbonate, acrylic polymers, and polypropylene.

6. The release handle mechanism as set forth in claim 1, wherein said housing is attached to the inner surface of said trunk lid.

7. The release handle mechanism as set forth in claim 1, wherein said handle includes an insert having a base surface and at least one projection and a phosphorescent material disposed in contact with said base surface.

8. The release handle mechanism as set forth in claim 7, wherein said projection is disposed above said phosphorescent material.

9. In a motor vehicle having a trunk and a trunk lid, said trunk lid being hingedly attached to said motor vehicle, said trunk lid capable of being latched to said vehicle to create a closed position of said trunk lid by means of a latch, said latch capable of being released to create an open position of the trunk lid, a release handle mechanism for said trunk lid comprising:

a housing comprised of phosphorescent material; and a handle disposed within said housing capable of releasing the latch, said housing is disposed substantially behind said handle and said phosphorescent material of said housing covers an area larger than said handle to provide an appealing visual impression.

10. The release handle mechanism as set forth in claim 9 further comprising a light source attached to said housing.

11. The release handle mechanism as set forth in claim 9, further comprising an ultraviolet light attached to said housing.

12. The release handle mechanism as set forth in claim 9, further comprising a light source disposed within 16 inches of said housing.

13. The release handle mechanism as set forth in claim 9, further comprising a light source disposed within 4 inches of said housing.

14. The release handle mechanism as set forth in claim 9, wherein said housing includes a back wall and an inclined surface extending therefrom upon which said handle is pivotally mounted.

15. The release handle mechanism as set forth in claim 14, wherein said handle includes a generally cylindrical horizontal portion and a generally cylindrical vertical portion pivotally connected to said inclined surface of said housing.

* * * * *